(12) United States Patent
Gazier et al.

(10) Patent No.: US 6,483,836 B1
(45) Date of Patent: Nov. 19, 2002

(54) ATM CONNECTION ACCELERATOR FOR USE IN COMMUNICATION NETWORKS

(75) Inventors: Michael Gazier, Nepean (CA); William Gage, Stittsville (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/221,794

(22) Filed: Dec. 28, 1998

(51) Int. Cl.[7] ............................................. H04L 12/56
(52) U.S. Cl. ................................................. 370/395.21
(58) Field of Search ............................... 709/238, 224; 370/232, 224, 395, 398, 234, 389

(56) References Cited

U.S. PATENT DOCUMENTS

| | | | | |
|---|---|---|---|---|
| 5,825,750 A | * | 10/1998 | Thompson | 370/224 |
| 6,067,287 A | * | 5/2000 | Chung-Ju et al. | 370/232 |
| 6,157,645 A | * | 12/2000 | Shobatake | 370/395 |
| 6,279,035 B1 | * | 8/2001 | Brown et al. | 709/224 |
| 6,286,052 B1 | * | 9/2001 | McCloghrie et al. | 709/238 |
| 6,324,166 B1 | * | 11/2001 | Yokoyama et al. | 370/234 |
| 2001/0026553 A1 | * | 10/2001 | Gallant et al. | 370/395 |

* cited by examiner

*Primary Examiner*—Hassan Kizou
*Assistant Examiner*—Lu Yin
(74) *Attorney, Agent, or Firm*—Gibbons, Del Deo, Dolan, Griffinger & Vecchione

(57) ABSTRACT

The invention relates to methods and apparatus for accelerating ATM connections. The apparatus includes a receiver configured to receive an ATM connection setup message, a memory coupled to the receiver, a table stored in the memory configured to store at least one table connection setup parameter, a parser engine configured to extract at least one message connection setup parameter, an analysis engine configured to compare the extracted message connection setup parameter to at least one table connection setup parameter, and a setup engine that makes a connection between at least two of the plurality of nodes based upon the table connection setup parameter or the message connection setup parameter.

21 Claims, 2 Drawing Sheets

ATM CONNECTION ACCELERATOR FOR USE IN COMMUNICATION NETWORKS

BACKGROUND OF THE INVENTION

An attribute of asynchronous transfer mode (ATM) systems is the ability to provide a user-specified quality of service (QoS) on a connection basis. ATM allows multiple connections to be established over a single physical link and allows a different QoS to be associated with each connection. For example, the QoS may include the priority assigned to a connection so that a voice connection may be assigned a higher priority than a data connection. This prioritization permits information transmitted over the higher priority connections to experience a smaller propagation delay as it travels from the sender to the receiver. Thus, in a network carrying large amounts of information, voice transmission will typically experience minimal delays while the data may be delayed longer and some data packets may even be lost.

ATM is most commonly used in connection-oriented networks that require a setup procedure for every connection established through the network. The setup procedure requires that the requesting party define the QoS to be associated with that connection.

The QoS is defined by a traffic contract that is negotiated between the requestor and the network: the network will either agree to this traffic contract and establish a connection or it will reject the contract and block the connection. Certain applications, such as real-time multi-media, cellular, and telephony communications, demand efficiency and speed from the ATM network. This efficiency and speed is required not only in the transmission of information over connections but also in the initial setup of those connections.

The parameters used to define the traffic contract in ATM networks are very flexible, allowing in theory a very large number of different traffic contracts. The speed with which an ATM network can set up a connection is directly related to how efficiently the network can interpret the information in the requested traffic contract. Conventional ATM networks are relatively slow, generally capable of setting up between 10 and 100 connections per second.

Many factors determine the speed of connection setup, including the type and number of CPUs used in the ATM network, the speed of the signaling connection, the routing algorithms, etc. However, one of the major factors affecting connection setup speed is the generality of the traffic contract concept and the effort required by the network to interpret the contract proposed by a connection requestor. Current attempts to improve connection setup times include utilizing faster CPUs, changing network protocols, and dividing the network into a number of smaller partitions with fewer connection setup requests. However, these implementations are costly and can be difficult to implement in many networks.

Accordingly, it is an object of this invention to provide a cost-effective means to improve ATM network performance by significantly reducing the time required to interpret traffic contract requirements and to subsequently set up the desired connection. It is a further object of this invention to provide an ATM network connection setup mechanism that is adaptable to new types of applications with new QoS requirements.

These and other objects of the invention will become apparent to those skilled in the art from the following description thereof.

SUMMARY OF THE INVENTION

In accordance with the teachings of the present invention, these and other objects may be accomplished by the present invention, which enables reduction of the connection setup time in ATM networks by storing the attributes for connections with varying QoS characteristics in memory. These attributes need to be calculated only once, either when the network is initially configured or as the network learns of the connections required by different applications, and the results can be directly applied to all subsequent connection setup requests with similar or identical QoS requirements.

An embodiment of the invention includes an apparatus that accelerates ATM connection setup between network nodes. The apparatus includes a receiver, an analysis memory, an analysis engine, a setup memory, a setup engine, and a setup configuration block. The receiver may be configured to recognize an ATM connection setup message containing one or more parameters, including one or more traffic contract parameters. The analysis memory may contain predefined traffic contract configurations that have either been configured by individuals or learned by the setup configuration block. Each traffic contract configuration stored in the analysis memory contains a reference to an entry in the setup memory. Each entry in the setup memory contains a set of parameters that is used by the setup engine to allocate resources and establish an ATM connection.

Upon receipt of a message by the apparatus, the receiver analyzes the message to determine if it is an ATM setup message. If so, the receiver extracts the traffic contract parameters from the message and passes the parameters to the analysis engine. The analysis engine compares the traffic contract parameters to the entries in the analysis memory in an attempt to find a matching entry.

In a practice of the invention, the analysis engine may be designed to use fuzzy logic or neural network techniques so than an exact match is not required; the analysis engine finds the "best" match according to criteria defined for the fuzzy logic or neural network search.

On finding a matching entry, the analysis engine extracts the reference to the setup memory and passes this reference to the setup engine. The setup engine uses the information contained in the reference setup memory entry to allocate resources, to create the required ATM connection and to establish the Quality of Service (QoS) parameters for the connection.

In another practice of the invention, the setup configuration block may analyze the traffic contract parameters and generate new setup parameters which it uses to create the required ATM connection and to establish the Quality of Service (QoS) parameters for the connection. It also may store the results of its analysis in the setup memory and create a pattern in the analysis memory with a reference to the setup memory entry. This procedure will ensure that the delay incurred by detailed analysis is not repeated when similar requests are received in subsequent setup messages.

DESCRIPTION OF THE DRAWINGS

The invention will be more clearly understood by reference to the following detailed description of an exemplary embodiment in conjunction with the accompanying drawings, in which.

DETAILED DESCRIPTION OF THE INVENTION

The present invention is an apparatus and method for decreasing the time required for connection to an ATM system. An ATM connection setup message is received at a node and parsed to extract a set of traffic contract parameters therefrom. The traffic contract parameters are then compared to a set of traffic contract configurations stored in memory to determine whether the parameters to use for the connection setup are already known. If the parameters are already known, they are retrieved and used to make the connection. If not, they are determined in the conventional manner. However, these conventional determinations may be stored for use in subsequent connection requests having the same or similar traffic contract parameters.

Figure 1:
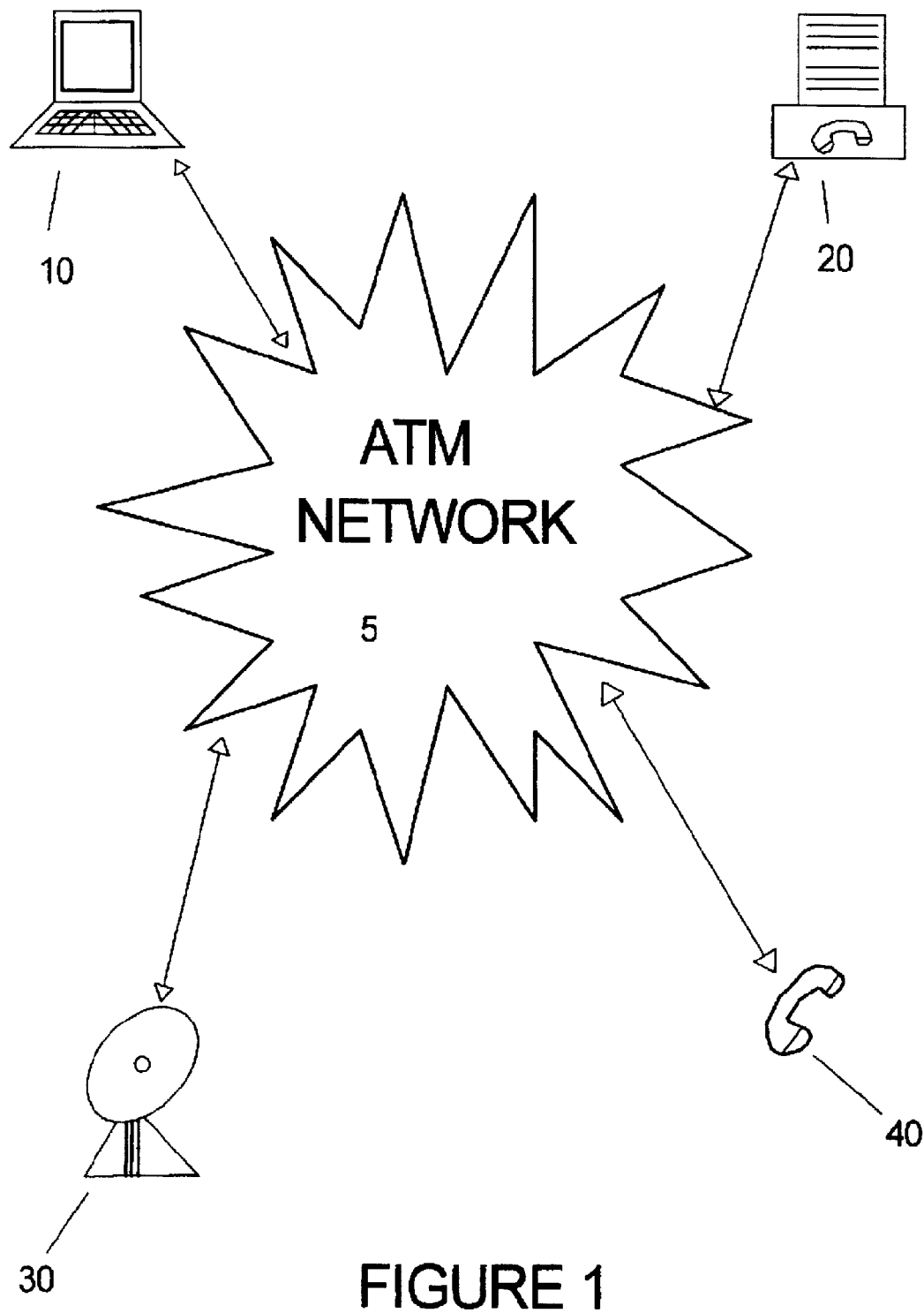
FIG. 1 is a schematic representation of a conventional ATM network.

FIG. 1 depicts a conventional ATM network 5 having multiple nodes connected thereto. As depicted in FIG. 1, a node may be a device such as a computer 10, a fax machine 20, a telephone 40, and/or other conventional network communications equipment 30 (e.g. satellite communications, cellular telephones, etc.). While the following description will be limited to ATM networks, those skilled in the art will recognize that the invention is not so limited and may be used in any type of packet switching network (e.g. Frame Relay, Internet Protocol, etc.).

Figure 2:
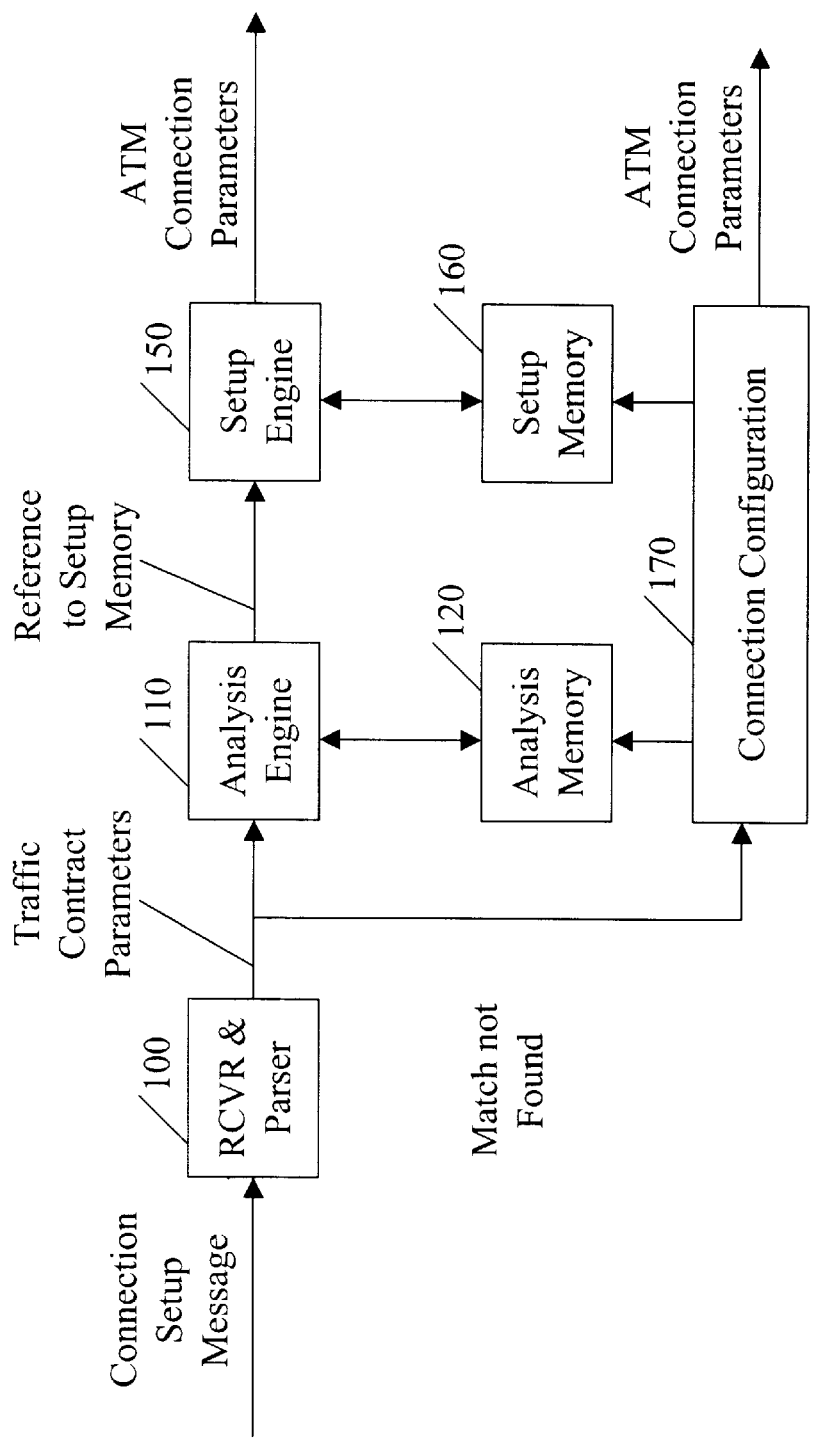
FIG. 2 is a schematic representation of an apparatus for accelerating ATM connection setup.

FIG. 2 depicts an apparatus for accelerating ATM connection setup which includes a receiver and parser 100, an analysis engine 110 in communication with an analysis memory 120, a setup engine 150 in communication with a setup memory 160, and a connection configuration block 170. The receiver and parser 100 analysis engine 110 and setup engine 150 may be realized in firmware, software, hardware (e.g., an Application Specific Integrated Circuit (ASIC), microcontroller, Programmable Array Logic (PAL), etc.) or a combination thereof. Additionally, the components do not need to be collocated, but may be if desired. Analysis memory 120 and setup memory 160 may be physically independent devices or they may be different regions of the same storage device. Different configurations provide adaptability for implementing the ATM connection setup accelerator into different types of ATM network communication devices.

When a user requests a connection through ATM network 5 of FIG. 1, a connection setup message is received by receiver and parser 100 of FIG. 2. The connection setup message might be in the format specified by Abstract Syntax Notation (ASN.1) or some other format.

If the network accepts the request, a "contract" is formed between the user and the network in which the network provides the connection according to traffic contract parameters specified in the connection setup message (e.g. the category of service requested, such as voice, facsimile, data, video, and so forth; and the Quality of Service (QoS) requested, such as priority, bandwidth, baud rate, etc.). Receiver and parser 100 extracts the traffic contract parameters and forwards them to analysis engine 110.

Predetermined traffic contract configurations which include sets of traffic contract parameters and references to entries in setup memory 160 may be stored in analysis memory 120. Each stored traffic contract configuration is associated with a reference. Those skilled in the art will recognize that one or more of the stored traffic contract configurations could be associated with multiple references to provide the system with additional options. The contents of analysis memory 120 may have been loaded by individuals, by connection configuration block 170, or by a combination of both.

Upon receiving a set of traffic contract parameters from receiver and parser 100, analysis engine 110 interrogates analysis memory 120 in an attempt to match the set of traffic contract parameters with one or more of the stored traffic contract configurations. Conventional searching and matching techniques may be employed, (including but not limited to "fuzzy logic" or neural network techniques that may find a close, though not exact, match). If a match (exact or closest depending upon the design choice) is found, an associated reference to an entry in setup memory 160 is retrieved from analysis memory 120, and is forwarded to setup engine 150.

Sets of connection parameters for making the requested connection through the ATM network are stored in setup memory 160. These sets of connection parameters may have been loaded by individuals, by connection configuration block 170, or by a combination of both. Setup engine 150 retrieves the appropriate set of parameters according to the location reference provided to it by analysis engine 110 based upon the current setup message. Setup engine 150 forwards the retrieved parameters to the ATM network which uses them to establish the requested connection.

If analysis memory 120 does not contain a traffic contract configuration which could be matched with the set of traffic contract parameters parsed from the connection setup message, the traffic contract parameters are forwarded to connection configuration block 170. Configuration block 170 computes the parameters required for connection through the ATM network in the conventional manner based upon the forwarded traffic contract parameters. The computed connection parameters may optionally be saved at an available address in setup memory 160 for use with subsequent similar ATM setup messages. The set of traffic contract parameters and the address used in setup memory 160 may be stored in analysis memory 120. Thus, subsequent occurrences of the same or similar connection setup messages can be processed using the matching features of the present invention.

It will thus be seen that the invention efficiently attains the objects set forth above, among those made apparent from the preceding description. In particular, the invention provides apparatus and methods of accelerating ATM connection setup. Those skilled in the art will appreciate that the configuration depicted in FIG. 2 increases network speed and reduces the number of discarded packets.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. An apparatus for accelerating ATM connections in a communications network having a plurality of nodes, comprising:

a memory;

a receiver configured to receive an ATM connection setup message, wherein said ATM connection setup message includes at least one traffic contract parameter;

a parser engine, coupled to said receiver, configured to extract said at least one traffic contract parameter from said ATM connection setup message;

a set of traffic contract configurations and a set of setup parameters stored in said memory, wherein each of said traffic contract configurations include at least one traffic contract parameter, wherein ones of said set of setup parameters correspond to ones of said set of traffic contract configurations;

an analysis engine configured to compare said at least one traffic contract parameter to said set of traffic contract configurations in an attempt to match said at least one traffic contract parameter to at least one of said traffic contract configurations in said set of traffic contract configurations; and a setup engine configured to connect at least two of said plurality of nodes based upon at least one of said setup parameters corresponding to a matched traffic contract configuration.

2. The apparatus according to claim 1, wherein said ATM connection setup message is an ASN.1 based setup message.

3. The apparatus according to claim 1, wherein said analysis engine is further configured to analyze said at least one traffic contract parameter, if said at least one traffic contract parameter does not match at least one of said traffic contract configurations in said set of traffic contract configurations, and to generate a new setup parameter, based upon said at least one traffic contract parameter.

4. The apparatus according to claim 3, wherein said new setup parameter and said at least one traffic contract parameter are stored in said memory.

5. The apparatus according to claim 1, wherein said parser engine includes a memory which is accessible by said analysis engine.

6. The apparatus according to claim 1, wherein said parser engine is updatable to be able to extract at least one new traffic contract parameter included in said ATM connection setup message.

7. The apparatus according to claim 1, wherein said analysis engine employs fuzzy logic to compare said at least one traffic contract parameter to said set of traffic contract configurations.

8. The apparatus according to claim 1, wherein said analysis engine has a neural network for comparing said at least one traffic contract parameter to said set of traffic contract configurations.

9. A method for accelerating ATM connections in a communication network having a plurality of nodes, comprising:

receiving an ATM connection setup message including at least one traffic contract parameter;

extracting said at least one traffic contract parameter from said ATM connection setup message using a parser engine;

defining a set of traffic contract configurations and a set of setup parameters in a memory, wherein each of said traffic contract configurations include at least one traffic contract parameter, wherein ones of said set of setup parameters correspond to ones of said set of traffic contract configurations;

comparing said at least one traffic contract parameter to said set of traffic contract configurations using an analysis engine, in an attempt to match said at least one traffic contract parameter to at least one of said traffic contract configurations in said set of traffic contract configurations; and connecting at least two of said plurality of nodes based upon at least one of said setup parameters corresponding to a matched traffic contract configuration if said comparing results in a match.

10. The method according to claim 9, further comprising: receiving an ASN.1 based setup message.

11. The method according to claim 9, further comprising:

generating a new set-up parameter based upon said at least one traffic contract parameter if said at least one traffic contract parameter does not match at least one of said traffic contract configurations in said set of traffic contract configurations.

12. The method according to claim 11 further comprising storing said new setup parameter and said at least one traffic contract parameter in said memory.

13. The method according to claim 9, further comprising updating said parser engine with at least one new traffic contract parameter.

14. The method according to claim 13, wherein said updating includes downloading at least one new traffic contract parameter.

15. The method according to claim 9, wherein said comparing said at least one traffic contract parameter to said set of traffic contract configurations is performed using fuzzy logic.

16. The method according to claim 9, wherein said comparing said at least one traffic contract parameter to said set of traffic contract configurations is performed using a neural network.

17. An apparatus for accelerating ATM connections in a communications network having a plurality of nodes, comprising:

receiver means for receiving an ATM connection setup message including at least one traffic contract parameter;

parser means coupled to said receiver means for extracting said at least one traffic contract parameter from said ATM connection setup message;

means for storing a set of traffic contract configurations and a set of setup parameters, wherein each of said traffic contract configurations includes at least one traffic contract parameter;

analysis means for comparing said at least one traffic contract parameter to said set of traffic contract configurations in an attempt to match said at least one traffic contract parameter to at least one of said traffic contract configurations in said set of traffic contract configurations; and setup means for connecting at least two of said plurality of nodes based upon at least one of said setup parameters corresponding to a matched traffic contract configuration if said at least one traffic contract parameter matches said matched traffic contract.

18. An ATM connection accelerator according to claim 17, wherein said message is an ASN.1 based setup message.

19. The ATM connection accelerator according to claim 17, further comprising:

means for generating a new setup parameter if said at least one traffic contract parameter does not match at least one of said traffic contract configurations in said set of traffic contract configurations.

20. The ATM connection accelerator according to claim 19, wherein said net set-up parameter and said at least one traffic contract parameter are stored in said means for storing.

21. The ATM connection accelerator according to claim 17, further comprising: means for updating said parser means with a new traffic contract parameter.

* * * * *